United States Patent [19]

Kippenhan et al.

[11] Patent Number: 5,010,514
[45] Date of Patent: Apr. 23, 1991

[54] STRUCTURED FIELDS AT A DATA STREAM BOUNDARY FOR DELIMITING FILES

[75] Inventors: B. William Kippenhan; Andrew W. Maholick, both of Raleigh, N.C.

[73] Assignee: International Business Machines Corporation, Armonk, N.Y.

[21] Appl. No.: 344,178

[22] Filed: Apr. 26, 1989

[51] Int. Cl.$^5$ .............................................. G06F 3/12
[52] U.S. Cl. .............................. 364/900; 364/940.62; 364/930; 364/927.99
[58] Field of Search ... 364/200 MS File, 900 MS File

[56] References Cited

U.S. PATENT DOCUMENTS 4,651,278  3/1987  Herzog et al. ...................... 364/900
4,835,673  5/1989  Rushby et al. ...................... 364/200

Primary Examiner—Thomas M. Heckler
Attorney, Agent, or Firm—John J. Timar

[57] ABSTRACT

Unique structured fields for delimiting the beginning and end of a data file sent to a print server in a computer network having a mixture of host processors and microprocessors for generating files to be printed. Each file sent to the print server is preceded by a unique beginning of file structured field and is terminated with a unique ending of file structured field.

10 Claims, 3 Drawing Sheets

FIG. 4

| BYTE | BIT | CONTENT | CONTENT DESCRIPTION |
|---|---|---|---|
| 0-1 | | X'0006' | THE LENGTH OF THIS STRUCTURE |
| 2-3 | | X'mmmm' | BEGIN/END OF FILE |
| 4 | 0-1 | FLAG1 B'00' | RESERVED |
| | | B'01' | END OF FILE IS BEING SENT. |
| | | B'10' | BEGIN OF FILE IS BEING SENT. |
| | | B'11' | RESERVED |
| | 2-7 | | THESE BITS ARE RESERVED. |
| 5 | | FLAG2 | RESERVED, MUST BE SET TO ZEROS. |

FIG. 5

| BYTE | BIT | CONTENT | CONTENT DESCRIPTION |
|---|---|---|---|
| 0-1 | | X'0005' | THE LENGTH OF THIS STRUCTURE |
| 2 | | X'nn' | QUERY REPLY |
| 3 | | QCODE X'yy' | BEGIN/END OF FILE |
| 4 | | FLAGS | RESERVED, MUST BE SET TO ZEROS |

STRUCTURED FIELDS AT A DATA STREAM BOUNDARY FOR DELIMITING FILES

BACKGROUND OF THE INVENTION

The present invention relates to computer networks in general and more particularly to a technique for unambiguously delineating a file or job to a print server device in a local area network to determine when a file or job can be sent to a physical printer.

In a local area network (LAN), the print server is the focal point for printing jobs from large processors or personal computers, all of which are attached to the local area network. The shared (spooled) printers are controlled by the print server function with output not being sent to any of the printers until the entire print file has been received at the server device. The files or jobs may be printed on a first in-first out (FIFO) basis or by some more sophisticated queueing mechanism. However, each file or job must be properly delineated to avoid overlap. The print server can be a specialized personal computer such as the IBM Personal Computer AT ™.

One of the primary network architectures in use today is the system network architecture (SNA) developed and marketed by IBM Corporation. Information units of different type formats carry messages through a computer network. A problem arises when devices utilizing different architectures are combined into a single network. Attempts to find an "End of File (EOF)" indicator which is consistent across SNA and non-SNA devices have not been successful. For example, the data stream architecture for IBM 3270 type devices does not address EOF in this environment.

There are several techniques in the prior art which are used to delimit jobs, however, none address the problem solved by this invention. In SNA networks, the BIND command is used at the initiation of communication between pairs of logical units to determine the functions that a device supports. A positive response from the receiver indicates that it supports the list of functions that the sender wishes to utilize. After all communication is complete, the sender issues an UNBIND command to end communications.

The BIND process takes a considerable amount of time, therefore once a BIND is established, it is left up for a long period of time. Thus, the BIND and UNBIND commands are not good for delimiting a job as they degrade performance. Furthermore, the concept does not exist in non-SNA devices. In systems which use the 3270 data stream architecture, more than half of the applications still use the binary synchronous communication (BSC) protocol for transmission, compared with the synchronous data link control (SDLC) protocol used by SNA devices.

The concept of brackets are used within the SNA architecture to delineate a transaction, a unit of work or a message. The "begin" bracket is, in effect, a flag or indication that a transaction has begun. The transaction is followed by an "end" bracket, which is, in effect, a flag that the transmission has ended.

An example of bracket usage is a query to another location for the time followed by a query for the date. If brackets were not used, the response to the time might be the date, if the date response program were faster than the time response program.

If a bracket is equated to a "file", this would be sufficient to delineate a file or job. The hazard is that different applications use brackets in various manners. For a print job, one might use a bracket per page, while another application might use a bracket for the entire document. The biggest limitation, however, is that the concept does not exist in non-SNA applications.

Time-outs are used for a variety of purposes in both SNA and non-SNA communications. For purposes of delimiting a job or file, they are to be avoided because they degrade performance. The method employed is to wait a longer than normal time to insure that the transaction is complete. The receiver device typically waits a minute in time duration to insure this.

The use of a unique control code embedded at the end of the job and interpreted as the end of job or end of file indicator also has several problems as regards current IBM implementations. For example, the end of file control code which exists in the ASCII character set, X'1A' has no counterpart in the EBCDIC character code set.

Certain printers support application programs that use the SNA Standard Character String (SCS) data stream while other printers support application programs that use the 3270 data stream. The first class of printers print unrecognized control codes as hyphens and the other class of printers reject unrecognized control codes with a negative response and terminate the printing process. The control code, End Message, used with the 3270 data stream is sent on a buffer basis and is not a reliable indicator of end of file as its name might imply. If an end of job control code were to be created, it would require the retrofit of many thousands of printers which would be prohibitively costly.

SUMMARY OF THE INVENTION

It is an object of this invention to provide a mechanism by which a host system in a computer network which uses a first type of data format can send a data stream for printing on a printer which uses a different type of data format. For example, the data stream sent to a printer may be a 3270 data stream while the printer uses an ASCII data stream.

It is further object of this invention to provide a method by which a print server device can support application programs using different data streams.

It is a still further object of this invention to interleave print jobs sent from a variety of sources. The sources include host systems, microprocessors and work stations.

These objects are achieved by this invention which uses messages with structured fields to insert control characters that signify the beginning or end of file for printing. In general terms, the host system generates and transmits a message seeking the identity of devices which require begin and end of file characters. The device responds with a novel format in which the structured field is coded in accordance with a unique pattern. Thereafter, the host system transmits the file to be printed by preceding it with a begin of file structured field and following it with an end of file structured field.

There are several advantages associated with this mechanism. First, it would be used only by those devices that support it as indicated by the query reply. Begin of file or end of file structured fields would not be sent to any device that does not support it. Second, since structured fields are at a data stream boundary level, they can be inserted into the data stream with little difficulty, as compared with alternatives such as control characters which are imbedded in the data. Using a unique control code at the end of the job would also require additional processing time to locate the end of file.

For non-programmable printers, where an intelligent control unit such as the IBM 3174 or a print server (specialized PC on a local area network) performs functions on behalf of a device, the printers would require no change to achieve the benefits of this invention as the control unit would recognize the end of file and convert it to a unique control code such as X'1A' on an ASCII printer or complete the transaction in an EBCDIC environment.

The foregoing features and advantages of the invention will be more fully described in the accompanying drawings.

BRIEF DESCRIPTION OF THE DRAWINGS

FIG. 4 shows the contents of the begin of file and end of file structured field.

FIG. 5 shows the contents of the begin of file/end of file query reply structured field.

DETAILED DESCRIPTION OF THE PREFERRED EMBODIMENT

Figure 1:
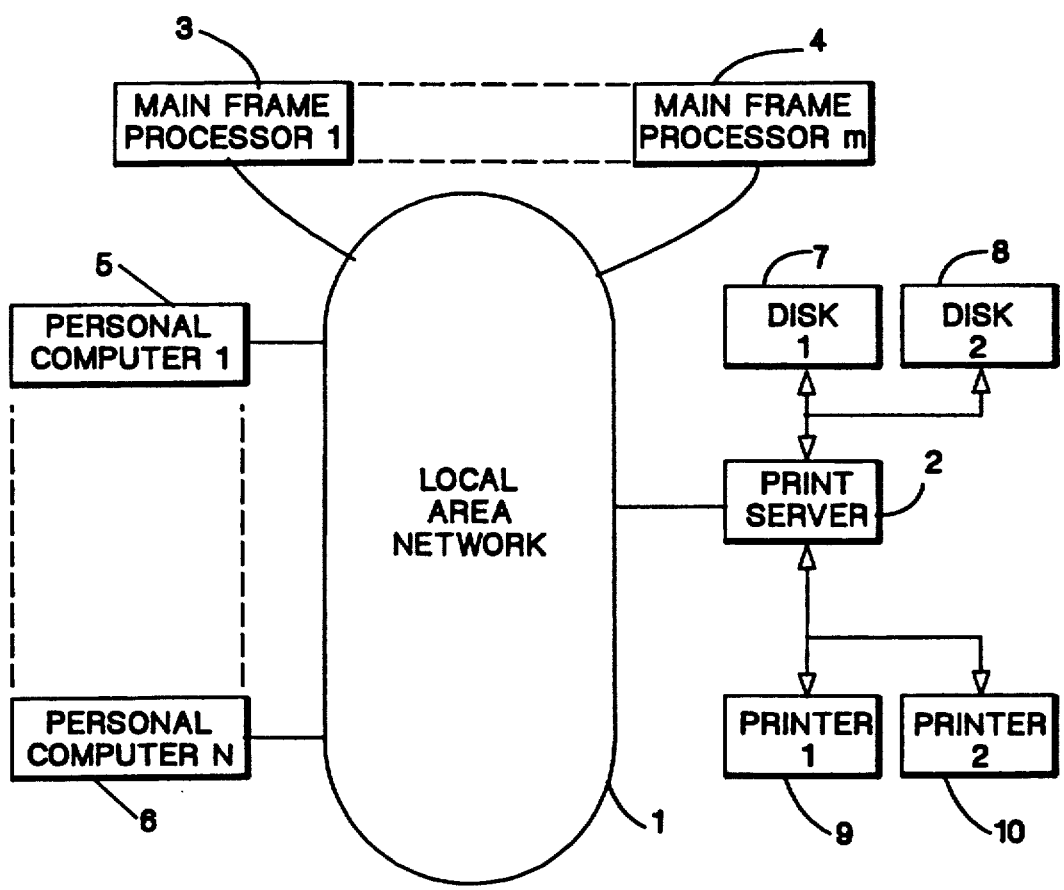
FIG. 1 shows a local area network to which are attached a print server and a plurality of mainframe processors and personal computers.

The invention is described herein as a means of delineating files or jobs in a communication network where a print server provides for the printing of files or jobs from many sources. FIG. 1 shows a local area network 1 including a print server 2 which services a plurality of mainframe processors 3, 4 and/or personal computers 5, 6. The print server 2 is a specialized processor to which is attached one or more disk drives 7, 8 and printers 9, 10 depending upon the volume of data which must be printed.

Programs residing in the print server 2 allow it to receive data from mainframe processors 3, 4 and personal computers 5, 6 and store the information as a file on a disk drive 7, 8. The print data is not sent directly to a physical printer device 9, 10 until the entire print file has been received by the print server. The program uses an end of file (EOF) indication to determine when the file or job has been completed and can be printed. The information in the file which is to be printed is then sent to a shared printer which is controlled by a program in the print server. Data files are printed on the printer in accordance with an established priority.

A data stream can consist of a continuous string of characters, a sequence of structured fields, or a combination of the two. The use of structured fields is allowed by some logical unit types. The use of structured fields allows a receiving logical unit to decompose a message into its component fields without having to examine each byte. A logical unit (LU) is a device or program by which an end user, a terminal operator, or an I/O mechanism gains access to the network. The SNA SCS data stream is used with logical unit type 1. This type of logical unit supports application programs that communicate with a terminal that can implement multiple I/0 devices using the SNA SCS data stream. The 3270 data stream is used with logical unit type 3. This type of logical unit supports application programs that communicate with 3270 printer devices or their equivalents using the 3270 data stream.

Data streams vary in their method for delineating a file or job ranging from none at all to unique characters in the data for indicating begin of file or end of file. The method taught by this invention utilizes structured fields. Its principal advantage is that the structured-field syntax permits variable length data and controls to be encoded in such a way as to facilitate processing a sequence of fields into component fields without having to examine every byte. Since structured fields are placed at a data stream boundary level, they can be inserted into the data stream with little difficulty as compared with alternatives such as control characters which are imbedded in the data.

Figure 2:
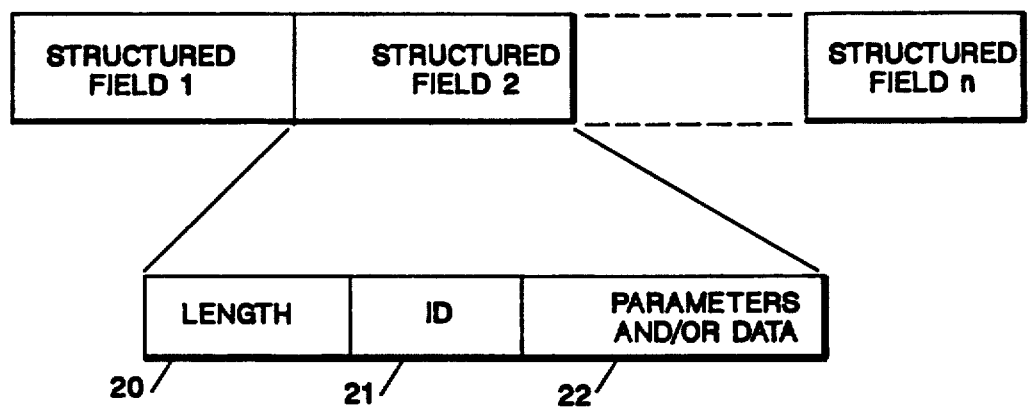
FIG. 2 shows the format of a variable length structured field.
Figure 3:
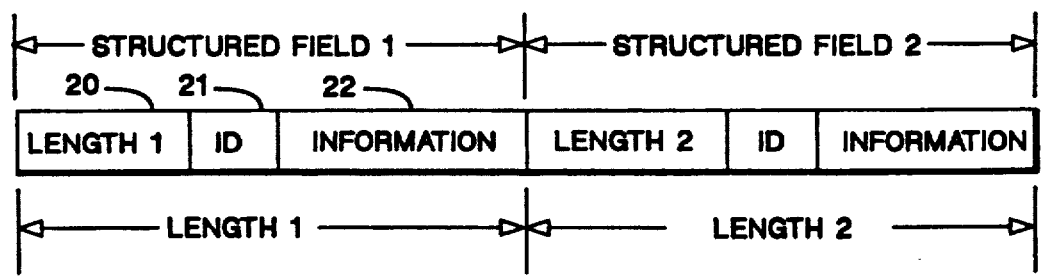
FIG. 3 shows how the length parameter pertains to a variable length structured field.

A structured field is of the form shown in FIG. 2. Each structured field contains a two-byte length field 20. This defines the length of the structured field including the length bytes as shown in FIG. 3. Next follows an identification (ID) field 21 that defines the function of the structured field. This is followed by an information field 22 which contains parameters and data in the format defined by the ID code.

The begin of file/end of file structured field 40 shown in FIG. 4 is used by the sender to indicate to the receiver that a new file or job is beginning or that the current file or job is completed. The first field 41 (bytes 0 and 1) is used to specify the length of the structured field. The second field 42 (bytes 2 and 3) is used for identification (ID) purposes to uniquely identify this structured field as begin of file/end of file. The third field 43 is a flag byte in which the first two bits are encoded to indicate whether a begin of file or end of file structured field is being sent. Binary '10' indicates the begin of file, and binary '01' indicates the end of file.

Certain error checking can be performed by the receiver based on the encoding of these bits in the flag byte. The following situations will cause rejection of the transmission by the receiver device (i.e., print server): (1) a structured field with an end of file is received without a structured field with begin of file being received; (2) a structured field with begin of file is received when a begin of file has been received previously, without an intervening end of file.

Certain systems require prior knowledge of the receiver's functional capability before sending any information to it. This information is solicited by the sender device by means of a query structured field. The query structured field requests the receiver device to transmit information regarding its functional capability and the parameters associated with that function.

The begin of file/end of file query reply indicates that the receiver device supports receiving the begin of file and end of file structured fields from the sender device to delineate a file or job. Begin of file or end of file structured fields would not be sent to any receiver device that does not support it.

FIG. 5 shows the contents of the begin of file/end of file query reply 50. The first field 51 (bytes 0 and 1) specifies the length of the structured field. The next field 52 (byte 2) designates that the structured field is of the Query Reply class. The third field 53 (byte 3) labeled QCODE contains the specific code to indicate that the begin of file or end of file structured fields are supported by the receiver device.

While the invention has been particularly shown and described with reference to the preferred embodiment thereof, it will be understood by those skilled in the art that various changes in form and details may be made therein without departing from the spirit and scope of the invention.

Having thus described our invention, what we claim as new, and desire to secure by Letters Patent is:

1. In a computer network having a plurality of host processors and microprocessors collectively referred to as sender devices, a plurality of printer devices, and at least one print server referred to as a receiver device, a method for delineating the beginning and the end of a data file sent to a print server for spooling to a target printer device, said method comprising:

sending an inquiry from the sender device to the print server to determine the functional capabilities of the target printer device;

returning a response from said print server to the sender device indicating the functions supported by the target printer device;

appending a beginning of file structured data field to the beginning of the data stream to form a modified data stream to be sent to the print server;

transmitting said modified data stream to said print server;

appending an end of file structured data field to the end of the modified data stream and transmitting said structured field to said print server;

examining and processing said modified data stream to extract the beginning of file and end of file structured data fields; and sending the file contained in the data stream to the target printer device for printing.

2. The method as claimed in claim 1 wherein the step of examining and processing the modified data stream includes the step of rejecting the transmitted data stream if an end of file structured field is received before a beginning of file structured field.

3. The method as claimed in claim 1 wherein the step of examining and processing the modified data stream includes the step of rejecting the transmitted data stream if a beginning of file structured field is received after a preceding beginning of file structured field without an intervening end of file structured field being received.

4. The method as claimed in claim 1 wherein the beginning of file structured field includes a length field, a file delimiter identification field, and a unique flag to indicate the beginning of a data file.

5. The method as claimed in claim 1 wherein the end of file structured field includes a length field, a file delimiter identification field, and a unique flag to indicate the end of a data file.

6. The method as claimed in claim 1 wherein the query reply structured field includes a length field, a query reply identification field, and a unique code to indicate that the receiver device supports receiving beginning of file and end of file structured fields.

7. In a computer network having a plurality of host processors and microprocessors collectively referred to as the sender devices, a plurality of printers, and at least one print server referred to as a receiver device, an apparatus for delineating the beginning of a file and the end of a data file sent to the print server for spooling to a target printer comprising:

means at the receiver device for indicating the functions supported by the target printer device;

means at the sender device for generating a beginning of file structured field and appending it at the beginning of the file sent to the print server; and means at the sender device for generating an end of file structured field and appending it to the end of the file sent to the print server.

8. The beginning of file structured field of claim 7 including a first field for indicating the length of the structured field, a second field for indicating that the structured field represents the delimiting of the data file, and a third field for holding a unique flag to indicate the beginning of the data file.

9. The end of file structured field of claim 7 including a first field for indicating the length of the structured field, a second field for indicating that the structured field represents the delimiting of the data file, and a third field for holding a unique flag to indicate the end of the data file to be sent.

10. The apparatus as claimed in claim 7 wherein the means at the receiver device for indicating the functions supported includes a query reply structured field message having a first field indicating the length of the structured field, a second field indicating that the message is a query reply, and a third field to indicate that the target printer device supports receipt of a file preceded and terminated with structured field delimiters.

* * * * *